United States Patent
Kato et al.

(10) Patent No.: US 9,600,988 B2
(45) Date of Patent: Mar. 21, 2017

(54) IMAGE PROCESSING DEVICE AND METHOD FOR PROCESSING IMAGE

(71) Applicant: FUJITSU LIMITED, Kawasaki-shi, Kanagawa (JP)

(72) Inventors: Tetsuhiro Kato, Yokohama (JP); Osafumi Nakayama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 250 days.

(21) Appl. No.: 14/036,790

(22) Filed: Sep. 25, 2013

(65) Prior Publication Data

US 2014/0139673 A1 May 22, 2014

(30) Foreign Application Priority Data

Nov. 22, 2012 (JP) ................................. 2012-255936

(51) Int. Cl.
*G08B 13/196* (2006.01)
*H04N 7/18* (2006.01)
*G06K 9/00* (2006.01)

(52) U.S. Cl.
CPC ... *G08B 13/19697* (2013.01); *G06K 9/00791* (2013.01); *G06K 9/00798* (2013.01); *G06K 9/00805* (2013.01); *H04N 7/18* (2013.01)

(58) Field of Classification Search
CPC ............... G06K 19/06028; G06K 7/12; G06K 9/00791; G06K 9/00798; G06K 9/00805; G09F 3/0297; G08B 13/19697; H04N 7/01
USPC ........................................................ 348/148
See application file for complete search history.

(56) References Cited

U.S. PATENT DOCUMENTS

| | | | | |
|---|---|---|---|---|
| 4,630,904 A * | 12/1986 | Pastore | ..................... | B60R 1/12 359/636 |
| 5,956,181 A * | 9/1999 | Lin | ..................... | B60R 1/12 359/630 |
| 6,449,383 B1 * | 9/2002 | Oike et al. | ..................... | 382/104 |
| 6,453,056 B2 * | 9/2002 | Laumeyer et al. | ........... | 382/104 |
| 7,068,844 B1 * | 6/2006 | Javidi et al. | ................... | 382/218 |
| 7,459,664 B2 * | 12/2008 | Schofield et al. | ......... | 250/208.1 |
| 7,663,502 B2 * | 2/2010 | Breed | ..................... | B60C 11/24 340/12.25 |

(Continued)

FOREIGN PATENT DOCUMENTS

| | | |
|---|---|---|
| EP | 2 031 557 A1 | 3/2009 |
| JP | 2002-352226 | 12/2002 |

(Continued)

OTHER PUBLICATIONS

Matsubara et al, Effectiveness of a blind spot visualization system with a video camera for safe lance changes, 2012.*

(Continued)

*Primary Examiner* — Shan Elahi
(74) *Attorney, Agent, or Firm* — Staas & Halsey LLP

(57) ABSTRACT

An image processing device includes: a memory; and a processor coupled to the memory and configured to: obtain image data regarding an image captured by an image capture device that moves along with a moving body and of which image capture direction is a certain traveling direction of the moving body, and detect a feature caused by a reflection from features based on information regarding positions of the features in the image data at a time when the moving body has moved in a direction different from the image capture direction.

13 Claims, 11 Drawing Sheets

(56) References Cited

U.S. PATENT DOCUMENTS

| | | | | |
|---|---|---|---|---|
| 8,391,555 | B2* | 3/2013 | Sakamoto | 382/104 |
| 8,465,162 | B2* | 6/2013 | Weller | B60R 1/12 |
| | | | | 359/879 |
| 8,503,062 | B2* | 8/2013 | Baur | B32B 17/10174 |
| | | | | 359/265 |
| 8,825,259 | B1* | 9/2014 | Ferguson | G05D 1/0214 |
| | | | | 104/124 |
| 2002/0042676 | A1* | 4/2002 | Furusho | 701/300 |
| 2002/0070872 | A1* | 6/2002 | Deline | B60K 35/00 |
| | | | | 340/815.4 |
| 2002/0167512 | A1* | 11/2002 | Lee | G06T 7/002 |
| | | | | 345/419 |
| 2003/0095711 | A1* | 5/2003 | McGuinness | G06T 7/0028 |
| | | | | 382/209 |
| 2003/0169213 | A1* | 9/2003 | Spero | G02B 5/20 |
| | | | | 345/7 |
| 2003/0209893 | A1* | 11/2003 | Breed et al. | 280/735 |
| 2004/0202001 | A1* | 10/2004 | Roberts | B60Q 9/00 |
| | | | | 362/494 |
| 2005/0046584 | A1* | 3/2005 | Breed | B60C 11/24 |
| | | | | 280/735 |
| 2006/0202843 | A1* | 9/2006 | Ota | G06K 9/2036 |
| | | | | 340/576 |
| 2007/0124030 | A1* | 5/2007 | Mori | G06T 7/2033 |
| | | | | 701/1 |
| 2007/0159531 | A1* | 7/2007 | Anderson | H04N 7/18 |
| | | | | 348/148 |
| 2007/0184284 | A1* | 8/2007 | Varaprasad | B32B 17/06 |
| | | | | 428/426 |
| 2007/0279756 | A1* | 12/2007 | Rosario | B60R 1/12 |
| | | | | 359/633 |
| 2008/0002027 | A1* | 1/2008 | Kondo et al. | 348/148 |
| 2008/0219560 | A1* | 9/2008 | Morimoto | G06K 9/38 |
| | | | | 382/195 |
| 2008/0317288 | A1* | 12/2008 | Aoki et al. | 382/104 |
| 2009/0167864 | A1* | 7/2009 | Unoura | 348/148 |
| 2009/0174573 | A1* | 7/2009 | Smith | G08G 1/0962 |
| | | | | 340/905 |
| 2009/0243824 | A1* | 10/2009 | Peterson | B60R 1/12 |
| | | | | 340/435 |
| 2009/0245582 | A1* | 10/2009 | Sakamoto | 382/104 |
| 2009/0268025 | A1* | 10/2009 | Hiramaki | B60R 1/00 |
| | | | | 348/148 |
| 2010/0100268 | A1* | 4/2010 | Zhang | B60W 30/09 |
| | | | | 701/25 |
| 2010/0201816 | A1* | 8/2010 | Lee | B60R 1/12 |
| | | | | 348/148 |
| 2010/0253541 | A1* | 10/2010 | Seder | G01S 13/723 |
| | | | | 340/905 |
| 2011/0025836 | A1* | 2/2011 | Tamaki | B60R 11/04 |
| | | | | 348/78 |
| 2011/0091113 | A1* | 4/2011 | Ito | G06K 9/00248 |
| | | | | 382/197 |
| 2011/0095908 | A1* | 4/2011 | Nadeem et al. | 340/905 |
| 2011/0228983 | A1* | 9/2011 | Matsuda | G06F 3/167 |
| | | | | 382/103 |
| 2011/0234386 | A1* | 9/2011 | Matsuda | G06F 3/017 |
| | | | | 340/12.54 |
| 2011/0304444 | A1* | 12/2011 | Zhang et al. | 340/425.5 |
| 2012/0083960 | A1* | 4/2012 | Zhu | G05D 1/0214 |
| | | | | 701/23 |
| 2012/0224060 | A1* | 9/2012 | Gurevich et al. | 348/148 |
| 2012/0275712 | A1* | 11/2012 | Inaba | G06K 9/6211 |
| | | | | 382/201 |
| 2012/0308114 | A1* | 12/2012 | Othmezouri et al. | 382/154 |
| 2013/0082874 | A1* | 4/2013 | Zhang | G01S 5/0072 |
| | | | | 342/357.31 |
| 2013/0106682 | A1* | 5/2013 | Davis | G06F 17/30967 |
| | | | | 345/156 |
| 2013/0106685 | A1* | 5/2013 | Davis | G06F 17/30047 |
| | | | | 345/156 |
| 2013/0110804 | A1* | 5/2013 | Davis | G06F 17/30967 |
| | | | | 707/706 |
| 2013/0128045 | A1* | 5/2013 | Habbu et al. | 348/148 |
| 2013/0250107 | A1* | 9/2013 | Okada et al. | 348/148 |

FOREIGN PATENT DOCUMENTS

| | | | | |
|---|---|---|---|---|
| JP | 2009-245354 | | 10/2009 | |
| JP | 2010-61375 | | 3/2010 | |
| JP | 2010061375 A | * | 3/2010 | G06T 7/60 |
| JP | 2010-146284 | | 7/2010 | |
| JP | 2011-215769 | | 10/2011 | |
| JP | 2012-103748 | | 5/2012 | |
| JP | 2012-108665 | | 6/2012 | |
| WO | 2010/038223 A1 | | 4/2010 | |
| WO | WO 2010038223 A1 | * | 4/2010 | B60R 1/00 |

OTHER PUBLICATIONS

Katzourakis et al, Driver Steering Override for Lane-Keeping Aid Using Computer-Aided Engineering, 2015.*
Extended European Search Report dated Feb. 10, 2015 in corresponding European Patent Application No. 13186367.2.
Yamashita et al., "Removal of Adherent Noises from Images of Dynamic Scenes by Using a Pan-Tilt Camera", Proceedings of 2004 IEEE/RSJ International Conference on Intelligent Robots and Systems, Sep. 28-Oct. 2, 2004, Sendai, Japan, pp. 437-442.
Japanese Office Action dated Jun. 21, 2016 in corresponding Japanese Patent Application No. 2012-255936.
European Office Action dated Dec. 8, 2016 in corresponding European Patent Application No. 13 186 367.2.

* cited by examiner

FIG. 3

| POSITION i (xj,yk) | APPEARANCE STRENGTH Qi |
|---|---|
| (0,0) | Q (0,0) |
| (1,0) | Q (1,0) |
| (2,0) | Q (2,0) |
| (3,0) | Q (3,0) |
| ... | ... |

IMAGE PROCESSING DEVICE AND METHOD FOR PROCESSING IMAGE

CROSS-REFERENCE TO RELATED APPLICATIONS

This application is based upon and claims the benefit of priority from the prior Japanese Patent Application No. 2012-255936, filed on Nov. 22, 2012, the entire contents of which are incorporated herein by reference.

FIELD

The technique disclosed herein is related to a technique for processing an image.

BACKGROUND

In these years, various techniques are being developed in order to help drivers drive safely. One of the techniques is a technique for recognizing a recognition target in an image captured by a camera mounted on a vehicle. When a recognition target has been recognized, a warning or the like is issued to a driver.

For example, when the camera is installed inside the vehicle, the camera captures images of the outside through a sheet of glass. In this case, so-called "reflections" might occur in an image captured in an environment in which an intense light source such as the sun exists. Reflections are phenomena in which light from objects inside the vehicle is reflected by a surface of the sheet of glass or the like and detected by a sensor of the camera installed inside the vehicle, thereby causing a captured image to include images of the entirety or part of the objects inside the vehicle. Reflections occur when there is an object whose surface reflects light, such as a sheet of glass, in an image capture direction of the camera as in the case of the camera installed inside the vehicle. In the following description, an image including reflections will be referred to as a reflection image.

When a recognition target is to be recognized in a reflection image, recognition accuracy decreases. Therefore, an object recognition device for properly recognizing a recognition target even in a reflection image has been disclosed. The object recognition device is disclosed in Japanese Laid-open Patent Publication No. 2010-61375. The object recognition device sequentially captures images of a region in a certain direction of a vehicle and extracts a plurality of feature points from each image. The object recognition device then removes fixed feature points whose coordinates remain the same in the images from a plurality of feature points extracted from a latest image. Finally, the object recognition device recognizes an object on the basis of the feature points in the latest image from which the fixed feature points have been removed.

SUMMARY

According to an aspect of the invention, an image processing device includes: a memory; and a processor coupled to the memory and configured to: obtain image data regarding an image captured by an image capture device that moves along with a moving body and of which image capture direction is a certain traveling direction of the moving body, and detect a feature caused by a reflection from features based on information regarding positions of the features in the image data at a time when the moving body has moved in a direction different from the image capture direction.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 3 is a diagram illustrating an example of accumulated information.

DESCRIPTION OF EMBODIMENTS

The object recognition device that focuses upon a fact that feature points caused by reflections remain at the same coordinates in sequentially captured images may remove fixed feature points from the sequentially captured images.

However, the accuracy of the object recognition device is insufficient to remove reflections. That is, it is difficult for the object recognition device to accurately detect reflections.

Therefore, an object of the technique disclosed in the embodiments is to accurately detect reflections.

Embodiments will be described in detail hereinafter. The embodiments may be combined with each other insofar as the content of processing does not cause a contradiction.

Generally, features caused by reflections remain at the same positions in sequentially captured images. However, the inventors have focused upon a fact that some features that have not been caused by reflections also remain at the same positions in a plurality of images.

For example, features caused by an object located parallel to a traveling direction of a moving body remain at the same positions in a plurality of images. When the moving body is a vehicle and the traveling direction is a forward direction of the vehicle, for example, such features may be features caused by lines configuring a traffic lane, a guardrail, or the like. That is, the above-described object recognition device undesirably recognizes features that have not been caused by reflections as fixed feature points and accordingly removes the features.

In addition, insufficient accuracy of detecting reflections results in a decrease in the accuracy of recognizing objects. For example, if object recognition is performed in an image from which the features of an object to be recognized have been removed as fixed feature points, the object recognition device does not recognize the object.

Therefore, in an embodiment that will be described hereinafter, reflections are accurately detected by distinguishing features caused by the reflections and features caused by objects other than the reflections from each other more accurately.

Figure 1A:
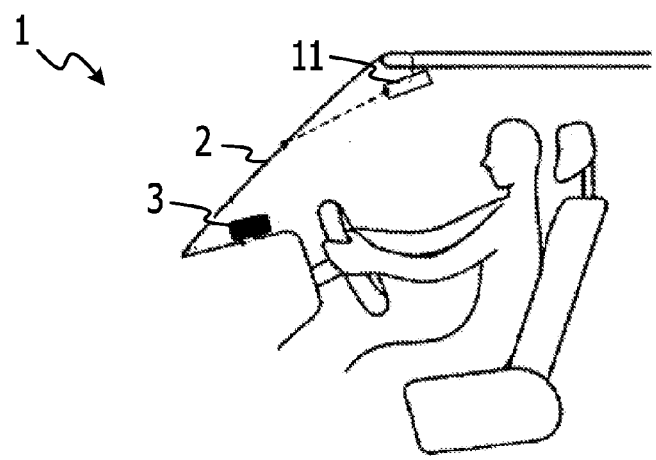
FIGS. 1A and 1B are diagrams illustrating a reflection.
Figure 1B:
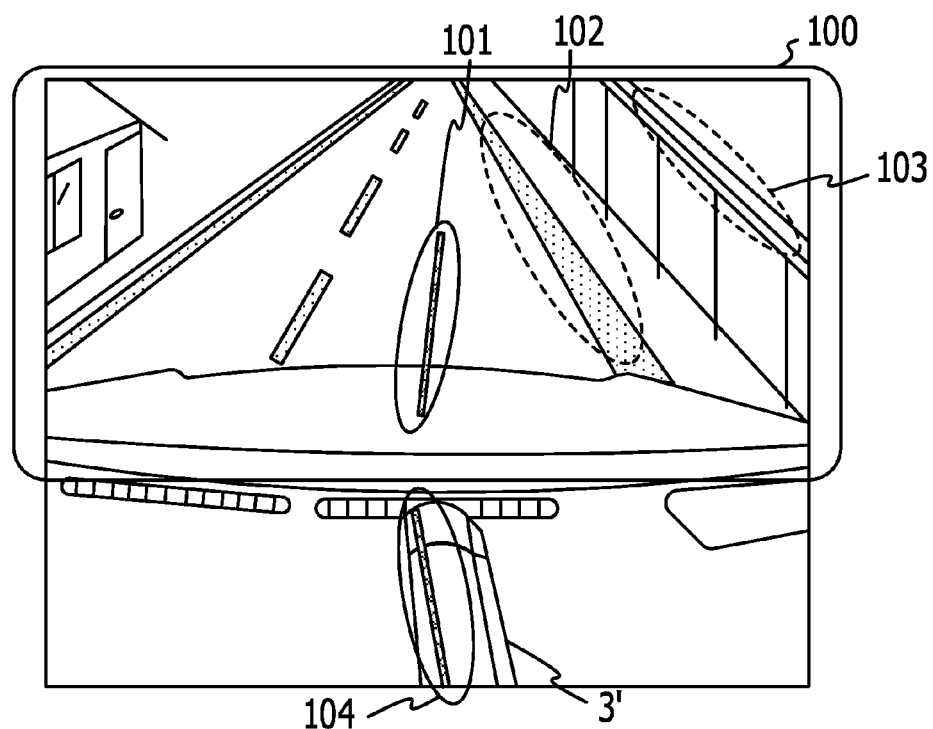

FIGS. 1A and 1B are diagrams illustrating a reflection. FIG. 1A is a diagram illustrating the positional relationship between an image capture device mounted on a moving body, an object that causes a reflection, and a sheet of glass that reflects light from the object. In this embodiment, the moving body is a vehicle 1. In this embodiment, the vehicle 1 includes an image capture device 11 therein. The image capture device 11 is, for example, a camera.

The image capture device 11 determines a direction including a certain traveling direction of the vehicle 1 as an image capture direction, and sequentially obtains images in the image capture direction. In this embodiment, the image capture device 11 is installed such that an optical axis thereof is directed in the forward and downward directions of the vehicle 1, in order to capture images of a surface of a road and a sight in the forward direction of the vehicle 1. That is, in this embodiment, a direction including the forward direction of the vehicle 1 is determined as the image capture direction.

However, the direction of the optical axis does not have to perfectly match the forward direction of the vehicle 1. That is, the image capture direction of the image capture device 11 does not have to perfectly match the certain traveling direction of the vehicle 1 in terms of the angle, and the image capture direction may be a direction in which the images of the surface of a road and a sight in the certain traveling direction may be captured.

When the image capture direction is the forward direction, the sheet of glass that causes reflections corresponds, for example, to a windshield 2 of the vehicle 1. Here, when the image capture device 11 and the object 3 exist on the same side relative to the windshield 2, the object 3 is reflected. For example, this holds true for a case in which the image capture device 11 and the object 3 exist in the vehicle 1. FIG. 1B illustrates an example of an image in which a reflection is occurring.

The image includes an outside region 100 captured through the windshield 2. The outside region 100, however, includes an image of a reflection 101 that does not actually exist outside the vehicle 1. The reflection 101 is part of the object 3 reflected onto the windshield 2 in the form of a line due to sunlight reflected from an edge 104 of the object 3 (an image 3' in the captured image).

Here, the position of the reflection 101 in the captured image is determined on the basis of the positional relationship between a light source and the object 3. Since the light source is the sun, the light source is located at infinity. Therefore, insofar as the object 3 does not move, the position of the reflection 101 does not change in a short period of time relative to the movement of the sun even if the vehicle 1 moves.

On the other hand, there are images of a line 102 configuring a traffic lane and a guardrail 103. In the following description, the line 102 configuring a traffic lane will be simply referred to as a "lane line". While the vehicle 1 is moving parallel to the image capture direction of the image capture device 11, features caused by the lane line 102 remain at the same positions in images even if the vehicle 1 moves forward. The same holds true for the guardrail 103. While the lane line and guardrail are described herein as an example, the present invention is not limited identifying any particular type of objects and maybe be used to detect and identify objects relative to safety of a moving body.

There is a warning device that warns a driver of deviation of a vehicle from a traffic lane in order to avoid an accident caused by the deviation. The warning device is a device having a so-called lane deviation warning function. When the vehicle is about to deviate from a traffic lane, the warning device calls the driver's attention by issuing a warning on the basis of the relative distance between the vehicle and the traffic lane.

When the object recognition device disclosed in Japanese Laid-open Patent Publication No. 2010-61375 has been applied to the warning device, feature points caused by a lane line might be removed since fixed feature points are deleted from a latest image. Therefore, because it is difficult to detect the lane line in an image from which the features caused by the lane line have been removed, the warning device does not appropriately issue a warning.

Therefore, an image processing device disclosed in this embodiment distinguishes the reflection 101 from the lane line 102, the guardrail 103, and the like. The image processing device then generates an image from which the reflection 101 has been removed. Next, the image processing device calculates the relative distance between the vehicle 1 and the traffic lane on the basis of the image from which the reflection 101 has been appropriately removed, in order to output the relative distance to the warning device. The image processing device then outputs the relative distance between the vehicle 1 and the traffic lane to the warning device. The technique disclosed herein is not limited to this, and the image processing device may output the image from which the reflection 101 has been removed to another device, instead.

Figure 2:
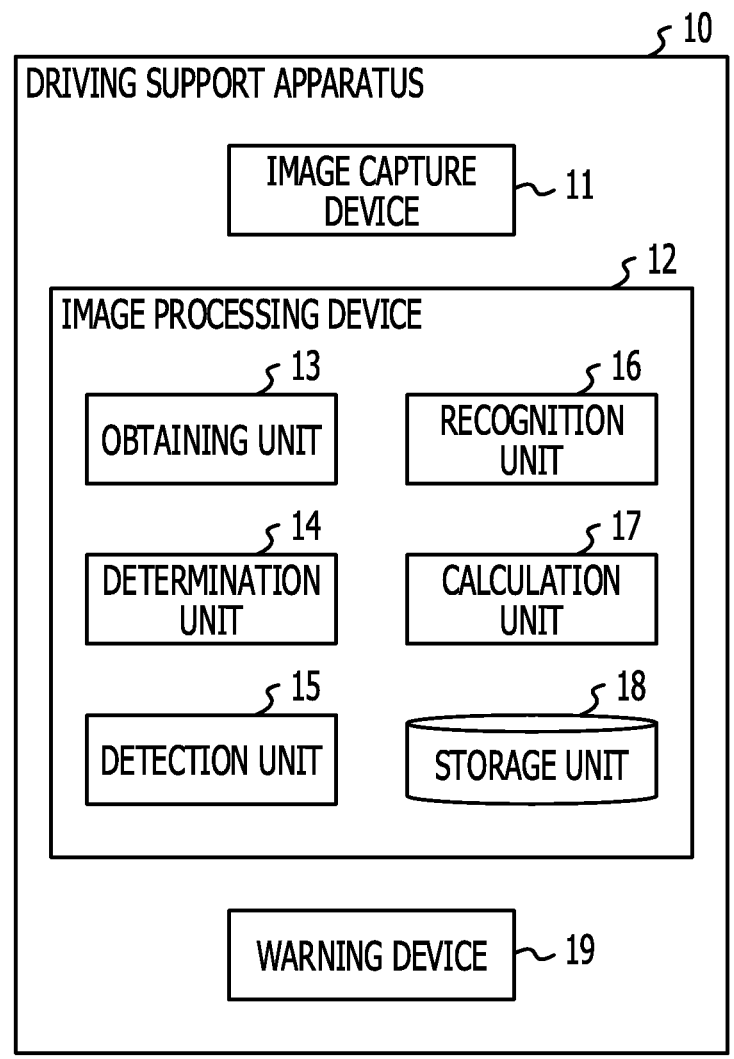
FIG. 2 is a functional block diagram illustrating a driving support apparatus including an image processing device according to an embodiment.

FIG. 2 is a functional block diagram illustrating a driving support apparatus including the image processing device according to this embodiment. A driving support apparatus 10 includes an image capture device 11, an image processing device 12, and a warning device 19. The image capture device 11 sequentially captures images of a region in the image capture direction. Furthermore, the image capture device 11 sequentially outputs image data regarding each of the plurality of sequentially captured images to the image processing device 12.

The image processing device 12 executes a process for removing reflections. In this embodiment, the image processing device 12 also executes a process for recognizing a lane line and a process for calculating the relative distance between the vehicle and the traffic lane. Details of the processes will be described later. The image processing device 12 then outputs the relative distance to the warning device 19. The warning device 19 issues a warning to a driver on the basis of the relative distance.

The image processing device 12 will be described more specifically. The image processing device 12 includes an obtaining unit 13, a determination unit 14, a detection unit 15, a recognition unit 16, a calculation unit 17, and a storage unit 18.

The obtaining unit 13 sequentially obtains image data from the image capture device 11. The obtaining unit 13 then calculates the feature value of each pixel on the basis of the obtained image data. In this embodiment, when calculating edge strength as the feature value of each pixel, the obtaining unit 13 executes a process for extracting edges by applying a known algorithm.

The determination unit 14 determines whether or not there has been movement in a direction different from the image capture direction. That is, the determination unit 14 determines whether or not there has been movement in a direction different from the certain traveling direction of the vehicle 1. Since the image capture direction is the forward direction of the vehicle 1 in this embodiment, the determination unit 14 determines whether or not there has been movement in a lateral direction of the vehicle 1. The determination unit 14 determines whether or not there has been lateral movement at a certain point of time using a relative distance calculated in the process for calculating the relative distance executed in the past, details of which will be described later. Alternatively, the determination unit 14 may determine whether or not there has been lateral movement in accordance with an output of a steering angle sensor, a vehicle speed sensor, a tire angle sensor, a yaw rate sensor, or the like.

The detection unit 15 detects a reflection on the basis of information regarding the positions of features in an image at a time when it has been determined that there has been movement in a direction different from the image capture direction. For example, the detection unit 15 detects features in an image at a time when it has been determined that there has been lateral movement. The detection unit 15 determines that there is a feature when the feature value of each pixel is equal to or larger than a threshold.

The detection unit 15 then accumulates information. The accumulated information is information that depends on the frequency of appearances of a feature at each position of an image to be processed. For example, the accumulated information includes positional information and appearance strength. The appearance strength becomes larger as the frequency of appearances of a feature at a certain position becomes higher. That is, large appearance strength indicates that a feature has frequently appeared at the same position in images at times when it has been determined that there has been movement in a direction different from the image capture direction. The accumulated information is stored in the storage unit 18.

Next, the detection unit 15 detects a reflection in image data to be processed on the basis of the accumulated information. The detection unit 15 then removes the detected reflection from the image to be processed.

The recognition unit 16 recognizes a recognition target. In this embodiment, the recognition unit 16 recognizes a lane line. A known method is used for the process for recognizing a lane line. Alternatively, the recognition target may be another target such as a guardrail.

The calculation unit 17 calculates various values on the basis of a result of the recognition process. In this embodiment, the calculation unit 17 calculates the relative distance between the vehicle 1 and the center of a road on the basis of the position of the recognized lane line in an image. The relative distance is stored in the storage unit 18 as a position Xt of the vehicle 1 at a certain time t.

The storage unit 18 stores the accumulated information, information regarding the positions of the vehicle 1, and information regarding various thresholds. The accumulated information is, for example, stored in a table format. The information regarding the positions of the vehicle 1 includes at least information regarding the positions of the vehicle 1 at two latest times, and may be sequentially updated as a new position of the vehicle 1 is calculated. Various thresholds will be described later.

FIG. 3 is a diagram illustrating an example of a data table for the accumulated information. Appearance strength Qi is associated with a position i (Xj, Yk) of each pixel and stored. In FIG. 3, for example, a position (0, 0) has an appearance strength Q (0, 0). The appearance strength Q is updated by the detection unit 15. A reflection is detected on the basis of the appearance strength Qi at each position i (Xj, Yk).

Figure 4:
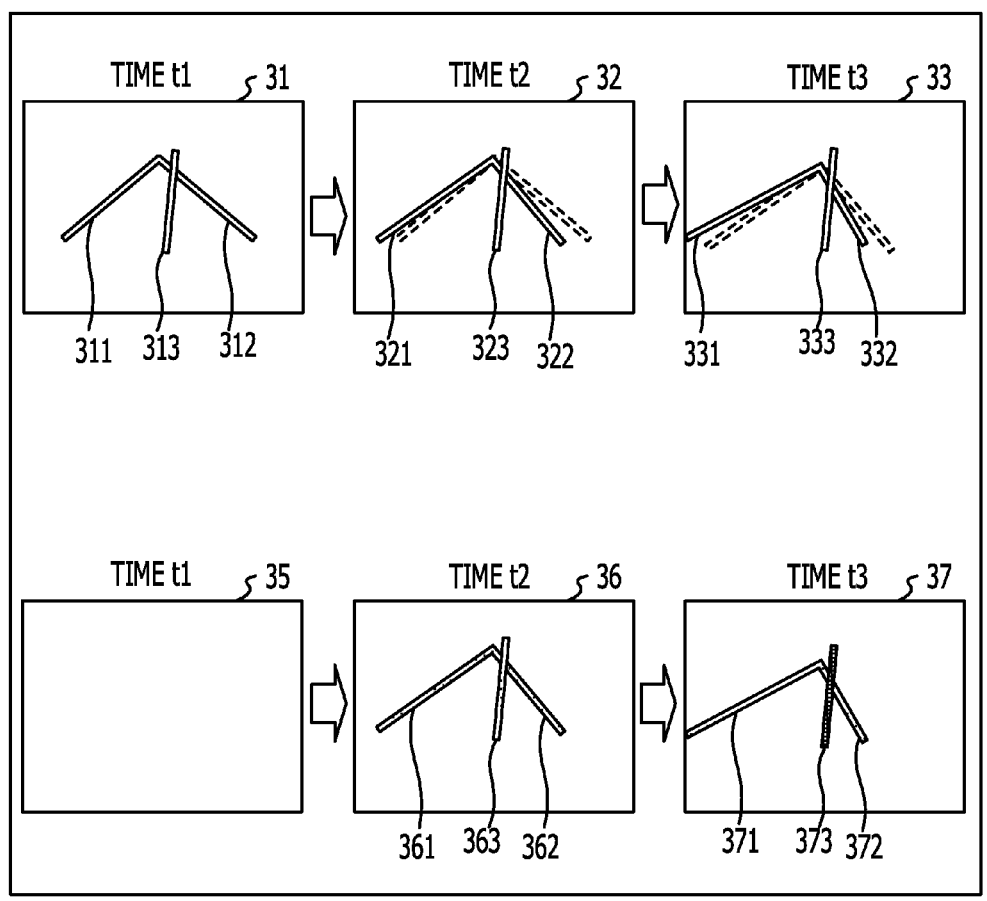
FIG. 4 is a diagram illustrating a process for accumulating features.

Now, a process for accumulating features performed by the detection unit 15 will be described with reference to FIG. 4. FIG. 4 is a diagram illustrating the process for accumulating features. In FIG. 4, assume that it is determined at a time t1 that there has been no lateral movement of the vehicle 1 and it is determined at times t2 and t3 that there has been lateral movement of the vehicle 1. When there has been lateral movement, the detection unit 15 updates the appearance strength at a position at which a feature exists to a larger value.

Edge images 31, 32, and 33 are obtained at the times t1, t2, and t3, respectively. The edge images 31, 32, and 33 are generated by executing the process for extracting edges on the basis of image data received from the image capture device 11. For example, the edge image 31 indicates that edges 311, 312, and 313 have been extracted at the time t1. Although the edges 311 and 312 are edges caused by lane lines and the edge 313 is an edge caused by a reflection, these edges are not distinguished from each other in the edge image 31.

Next, images 35, 36, and 37 are based on the information accumulated at the times t1, t2, and t3, respectively. The images 35, 36, and 37 are images of edges virtually drawn by providing a pixel value corresponding to the appearance strength Qi to a pixel at each position i. That is, since a larger pixel value is provided as the appearance strength Qi becomes larger, a thicker edge is drawn.

In addition, the information accumulated at each time t is information obtained by accumulating features in an image at each time t in the information accumulated until a previous time (time t−1). For example, the information accumulated at the time t3 is obtained by accumulating features regarding edges in the image at the time t3 in the information accumulated until the time t2.

Here, at the time t1 (there has been no lateral movement), the detection unit 15 does not accumulate information regarding features in the image at the time t1 in the accumulated information. That is, with respect to the position of each pixel included in the edges 311, 312, and 313, the appearance strength Q is not updated to a larger value. When the appearance strength at each position is zero at the time t1, the appearance strength remains at zero.

Next, at the time t2 (there has been lateral movement), the detection unit 15 accumulates information regarding features in the image at the time t2 in the accumulated information. That is, a certain value is added to the appearance strengths Q at positions corresponding to edges 321, 322, and 323. As indicated by the image 36, at the time t2, edges 361, 362, and 363 are drawn at the positions corresponding to the edges 321, 322, and 323, respectively. Broken lines in the edge image 32 virtually indicate the positions of the edges at the time t1. That is, when the vehicle 1 laterally moves, the edges caused by the lane lines move to positions different from those at the time t1.

Next, at the time t3 (there has been lateral movement), the detection unit 15 accumulates information regarding features in the image at the time t3 in the accumulated information. That is, the certain value is added to the appearance strengths Q at the positions of pixels corresponding to edges 331, 332, and 333. As indicated by the image 37, at the time t3, edges 371, 372, and 373 are drawn at the positions corresponding to the edges 331, 332, and 333, respectively.

Here, with respect to the position corresponding to the edge 333, since, at the time t3, the certain value is further added to the appearance strength Q to which the certain value has been added at the time 2, the edge 373 in the image 37 at the time t3 is thicker than the edge 363 in the image 36. On the other hand, the edges 321 and 322 at the time t2 are not extracted at the same positions at the time 3. Therefore, the certain value is not added to the appearance strengths Q for the edges 361 and 362 in the image 36.

In this embodiment, a certain value is subtracted from the appearance strength Q at a position at which a feature does not exist when information regarding the feature is accumulated. Therefore, even at a position at which the certain value has been added to the appearance strength Q because a feature has been extracted in the past, the appearance strength Q is updated to a smaller value if a feature does not exist thereafter. However, the minimum value of the appearance strength Q is 0.

Here, when there has been no movement in a direction different from the image capture direction, the detection unit 15 does not execute the process for accumulating information regarding a feature. However, a reflection might disappear when the conditions inside the vehicle 1 have changed. For example, a reflection might disappear when sunlight is blocked by an object such as when the vehicle 1 is passing under a land bridge or when the vehicle 1 has entered a building.

When a reflection has disappeared, a process for recognizing the disappearance of the reflection and immediately reducing the appearance strength is effective. That is, as described later, because when a reflection is to be detected, a position at which the appearance strength is large is determined to be a position at which a reflection is occurring, it is undesirably determined that the reflection is still occurring at the position even after the reflection disappears if the appearance strength remains large.

Therefore, even when there has been no movement in a direction different from the image capture direction, the process for reducing the appearance strength may be performed using information regarding the disappeared feature. That is, the detection unit 15 executes a process for checking whether or not features have disappeared in a latest image.

Figure 5:
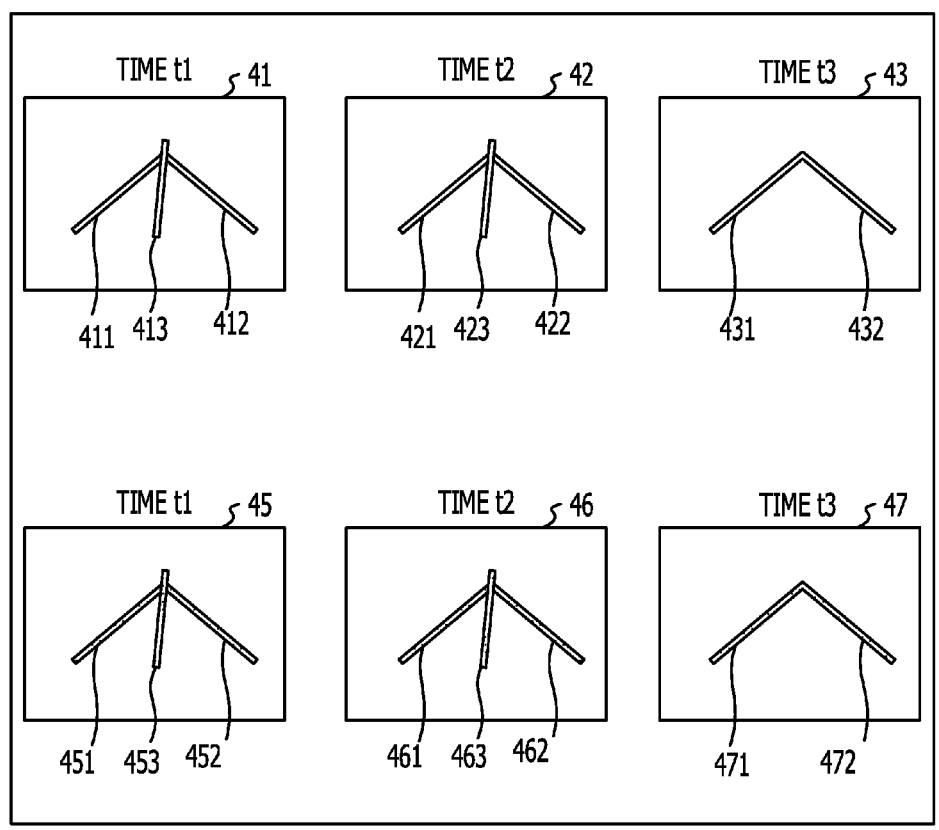
FIG. 5 is a diagram illustrating a process for checking features.

FIG. 5 is a diagram illustrating a process for checking features. In FIG. 5, assume that it is determined at the time t1 that there has been lateral movement and it is determined at the times t2 and t3 that there has been no lateral movement. In the checking process, for example, the detection unit 15 updates the appearance strength to a smaller value at a position at which the appearance strength is equal to or larger than a certain value when a feature has disappeared in the latest image.

Edge images 41, 42, and 43 are obtained at the times t1, t2, and t3, respectively. Images 45, 46, and 47 are based on the information accumulated at the times t1, t2, and t3, respectively. At the time t1 (there has been lateral movement), information is accumulated on the basis of the edge image 41. An image of the accumulated information is the image 45.

Here, at the time t2 (there has been no lateral movement), first, the detection unit 15 refers to the information accumulated until the time t1. The detection unit 15 then checks with the image at the time t2 whether or not there is an edge at each position at which the appearance strength Q is equal to or larger than the certain value. That is, the detection unit 15 determines whether or not there is an edge in the edge image 42 at the position of each pixel configuring an edge in the image 45.

If there is an edge, the appearance strength Q remains the same. That is, since edges are located at the same positions in the edge image 42 and the image 45, the information accumulated at the time t2 is the same as the information accumulated at the time t1. That is, the images 45 and 46 become the same.

Next, assume that, at the time t3 (there has been no lateral movement), an edge 423 that existed at the time t2 has disappeared as indicated by the edge image 43. The detection unit 15 refers to the information accumulated until the time t2 and checks whether or not there is an edge in the image at the time t3 at each position at which the appearance strength Q is equal to or larger than the certain value.

An edge 463 in the image 46 does not exist in the edge image 43 at the time t3. Therefore, at the time t3, the certain value is subtracted from the appearance strength Q at the corresponding position. When the certain value has been subtracted, the image of the accumulated information becomes the image 47 at the time t3. The value to be added and the value to be subtracted do not have to be the same, but in FIGS. 4 and 5, the same value is used for convenience of description.

When there has been no movement in a direction different from the image capture direction, the accumulation process for updating the appearance strength to a larger value is not performed. This is because although it becomes more likely to recognize a reflection as the appearance strength becomes larger, an accumulation process using an image captured under a condition under which it is difficult to distinguish a reflection from other features might result in incorrect removal.

Figure 6A:
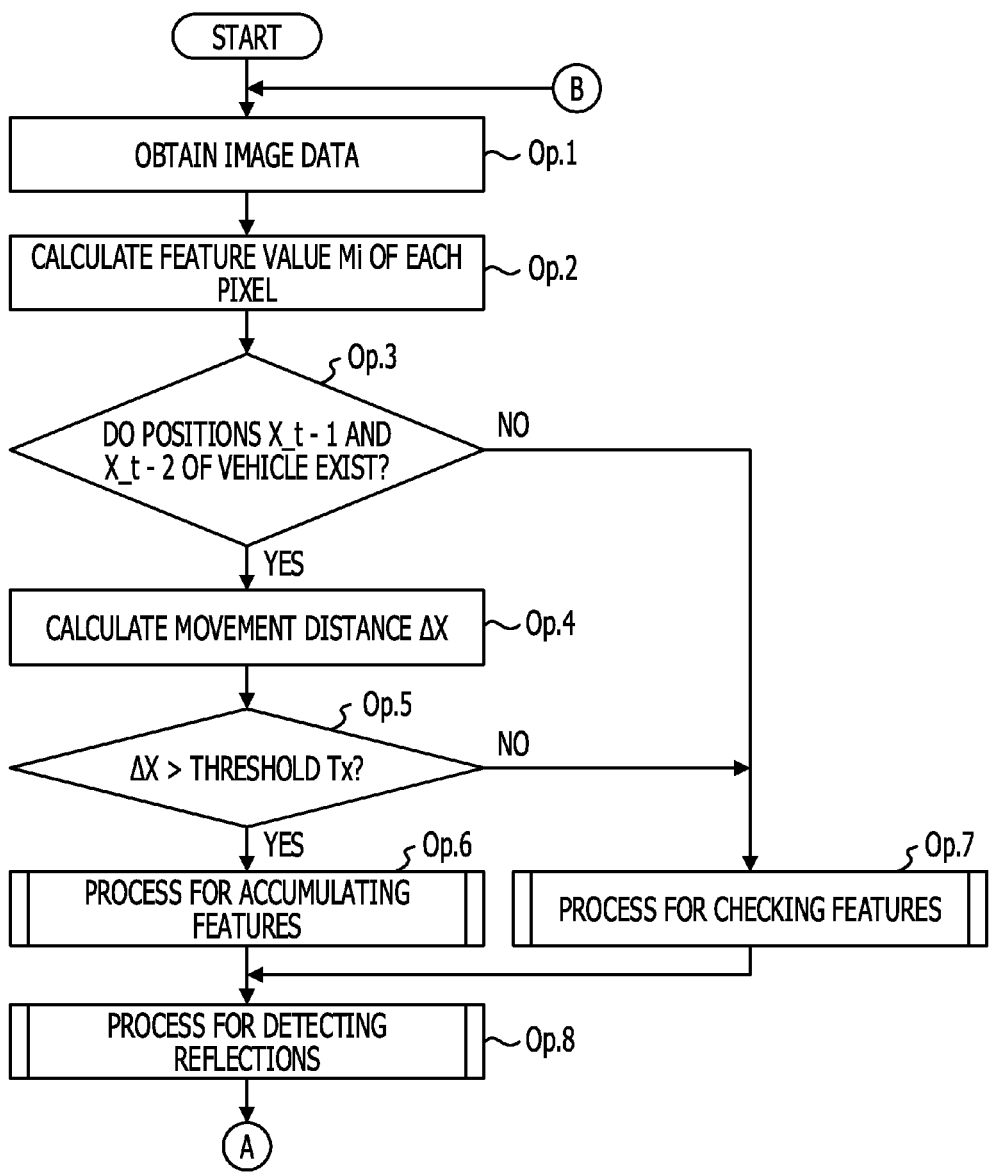
FIGS. 6A and 6B are flowcharts illustrating image processing.
Figure 6B:
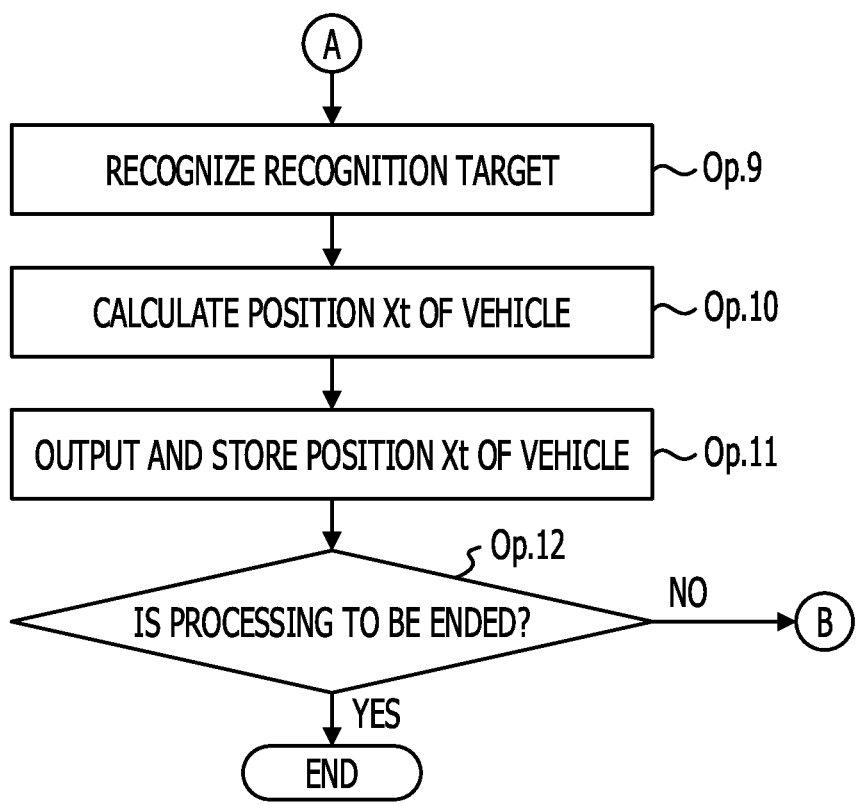

Next, a procedure of image processing according to this embodiment will be described. FIGS. 6A and 6B are flowcharts illustrating the image processing. First, the obtaining unit 13 obtains image data from the image capture device 11 (Op. 1). The obtained image data is image data regarding an image captured at the time t. The obtaining unit 13 then calculates a feature value Mi of each pixel on the basis of the obtained image data (OP. 2). In this embodiment, the feature value Mi is the edge strength of each pixel.

Next, the determination unit 14 determines whether or not information regarding the positions of the vehicle 1 at two points of time in the past exists (Op. 3). For example, the determination unit 14 refers to the storage unit 18 and determines whether or not the storage unit 18 stores a position X_t−1 of the vehicle 1 at a previous time and a position X_t−2 of the vehicle 1 at a time before the previous time. Although the positions of the vehicle 1 at the previous time of the current time t and the time before the previous time are used here, the processing of the determination is not limited to this.

For example, when the storage unit 18 stores the position of the vehicle 1 at each time calculated in the past, the determination unit 14 may determine whether or not the storage unit 18 stores the position of the vehicle 1 at the previous time and the position of the vehicle 1 at a time n times before the current time t. Alternatively, when the storage unit 18 stores a position X_base of the vehicle 1 that serves as a reference and the position X_t−1 at the previous time, the determination unit 14 may determine whether or not the storage unit 18 stores the position X_base and the position X_t−1. If it is determined in later processing that the vehicle 1 has moved in a direction different from the image capture direction, the position of the vehicle 1 at that time is stored as the position X_base. The position X_base is updated each time it has been determined that the vehicle 1 has moved in a different direction.

If information regarding the positions of the vehicle 1 at two points of time in the past exists (YES in Op. 3), the determination unit 14 calculates a movement distance ΔX (Op. 4). The movement distance is the distance of movement of the vehicle 1 in a direction different from the image capture direction. That is, in this embodiment, the movement distance is the distance of lateral movement. In this embodiment, the distance ΔX of lateral movement at the previous time is used. This is because, in consideration of the frame intervals of the image capture device 11, information at the previous time may be sufficiently used for the determination as to lateral movement at the time t. However, real-time lateral movement may be detected using the steering angle sensor or the like, instead.

Next, the determination unit 14 determines whether or not the movement distance ΔX is larger than a threshold Tx (Op. 5). If the movement distance ΔX is larger than the threshold Tx, it is determined that there has been lateral movement. If the movement distance ΔX is smaller than or equal to the threshold Tx, it is determined that there has been no lateral movement. The threshold Tx is determined on the basis of internal parameters such as the resolution of the image capture device 11 and the installation conditions. For example, in this embodiment, the threshold Tx is 200 mm.

Figure 7:
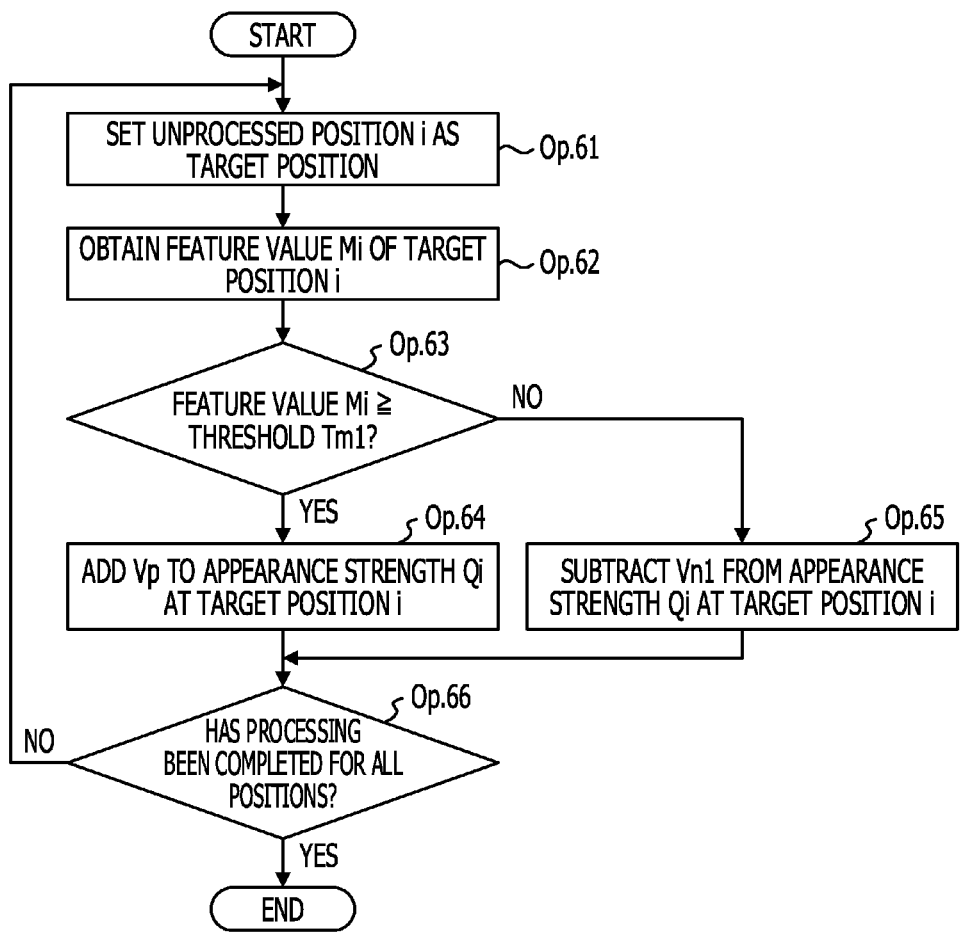
FIG. 7 is a flowchart illustrating the process for accumulating features.

If the movement distance ΔX is larger than the threshold Tx (YES in Op. 5), that is, if there has been lateral movement, the detection unit 15 executes the process for accumulating features (Op. 6). The accumulation process will be described in detail hereinafter. FIG. 7 is a flowchart illustrating the process for accumulating features.

First, the detection unit 15 sets an unprocessed position i as a target position (Op. 61). Next, the detection unit 15 obtains the feature value Mi of the target position i in an image at the time t (Op. 62). Next, the detection unit 15 determines whether or not the feature value Mi of a target pixel is equal to or larger than a threshold Tm1 (Op. 63).

The threshold Tm1 is determined, for example, in accordance with the internal parameters of the image capture device 11 and an algorithm for extracting a feature. For example, in this embodiment, the edge strength, which is the feature value, is assumed to range from 0 to 255, and the threshold Tm1 is set to 10.

If the feature value Mi is equal to or larger than the threshold Tm1 (YES in Op. 63), the detection unit 15 refers to the accumulated information and adds a certain value Vp to the appearance strength Qi corresponding to the target position i (Op. 64). On the other hand, if the feature value Mi is smaller than the threshold Tm1 (NO in Op. 63), the detection unit 15 refers to the accumulated information and subtracts a certain value Vn1 from the appearance strength Qi corresponding to the target position i (Op. 65). However, if the appearance strength Qi becomes smaller than zero as a result of the subtraction, the appearance strength Qi becomes zero.

That is, if there is a feature at the position i in the image at the time t, the detection unit 15 updates the appearance strength Qi in the accumulated information to a larger value. On the other hand, if there is no feature at the position i in the image at the time t, the detection unit 15 updates the appearance strength Q in the accumulated information to a smaller value.

Next, the detection unit 15 determines whether or not the processing has been completed for all the positions i (Op. 66). If the processing has not been completed (NO in Op. 66), the process returns to Op. 61, and the same processing is performed for a new position i. On the other hand, if the processing has been completed (YES in Op. 66), the process for accumulating features ends. The detection unit 15 then executes a process for detecting reflections, which will be described later.

Figure 8:
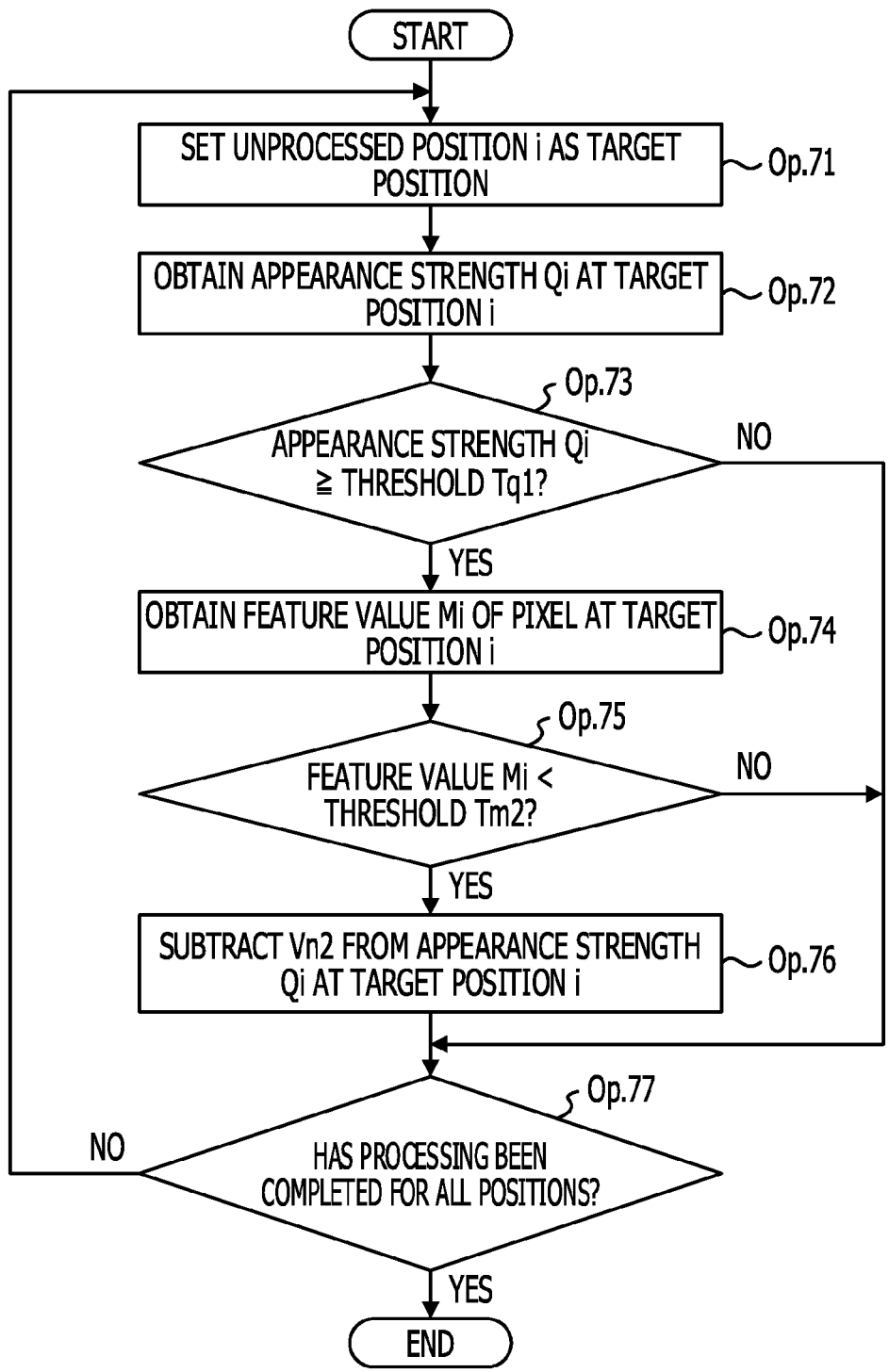
FIG. 8 is a flowchart illustrating the process for checking features.

In FIG. 6A, if information regarding the positions of the vehicle 1 at two points of time in the past does not exist (NO in Op. 3), or if the movement distance ΔX is smaller than or equal to the threshold Tx (NO in Op. 5), the detection unit 15 executes the process for checking features (Op. 7). The process for checking features will be described in detail hereinafter. FIG. 8 is a flowchart illustrating the process for checking features.

The detection unit 15 sets an unprocessed position i as a target position (Op. 71). The detection unit 15 then obtains the appearance strength Qi at the target position i from the accumulated information stored in the storage unit 18 (Op. 72). Next, the detection unit 15 determines whether or not the appearance strength Qi is equal to or larger than a threshold Tq1 (Op. 73).

An appropriate value is set to the threshold Tq1 in accordance with the system to be applied. The threshold Tq1 is set on the basis of the range of values of the appearance strength Qi. In this embodiment, the appearance strength Q ranges from 0 to 255 (Vp is 0.5), and the threshold Tq1 is 3. Furthermore, for example, when a possibility that features other than reflections are incorrectly removed is to be further reduced, a smaller value may be set.

If the appearance strength Qi is equal to or larger than the threshold Tq1 (YES in Op. 73), the detection unit 15 obtains the feature value Mi of a pixel corresponding to the target position i in the image at the time t1 (Op. 74). The detection unit 15 then determines whether or not the feature value Mi is smaller than a threshold Tm2 (Op. 75).

That is, if there has been a feature in past images with an appearance strength equal to or larger than the certain threshold, the detection unit 15 checks whether or not there is still the feature at the same position at the time t. The threshold Tm2 is determined, for example, in accordance with the internal parameters of the image capture device 11 and the algorithm for extracting a feature. For example, the threshold Tm2 may be the same as the threshold Tm1.

If the feature value Mi is smaller than the threshold Tm2 (YES in Op. 75), the detection unit 15 subtracts a certain value Vn2 from the appearance strength Qi at the target position i (Op. 76). That is, if a possibility that a reflection has disappeared is detected, the detection unit 15 reduces the appearance strength Qi at a position at which the reflection is likely to have existed.

Next, the detection unit 15 determines whether or not the processing has been completed for all the positions i (Op. 77). If the processing has not been completed (NO in Op. 77), the process returns to Op. 71, and the same processing is performed for a new position i. On the other hand, if the processing has been completed (YES in Op. 77), the process for checking features ends. The detection unit 15 then executes the process for detecting reflections, which will be described later.

If the appearance strength Qi is smaller than the threshold Tq1 (NO in Op. 73), or if the feature value Mi is equal to or larger than the threshold Tm2 (NO in Op. 75), the detection unit 15 executes the processing in Op. 77.

Here, the relationship between Vp, Vn1, and Vn2 will be described. Vp is set to a value larger than Vn1 and Vn2. Alternatively, the relationship between Vp, Vn1, and Vn2 is determined in accordance with the system to be applied. That is, the relationship between Vp, Vn1, and Vn2 is determined on the basis of whether suppression of incorrect removal or removal of reflections takes priority over the other.

For example, when removal of reflections is to take priority, Vp is set to a value larger than Vn1 and Vn2. That is, when an image in which there has been lateral movement has been captured, the appearance strength Qi reaches the threshold Tq2, at which a reflection is removed, with a smaller delay.

In this embodiment, for example, Vp is set to a value twice Vn1. Vn1 is appropriately set on the basis of the range of values of the appearance strength Qi. In addition, for example, Vn2 is set to a value half Vn1.

Figure 9:
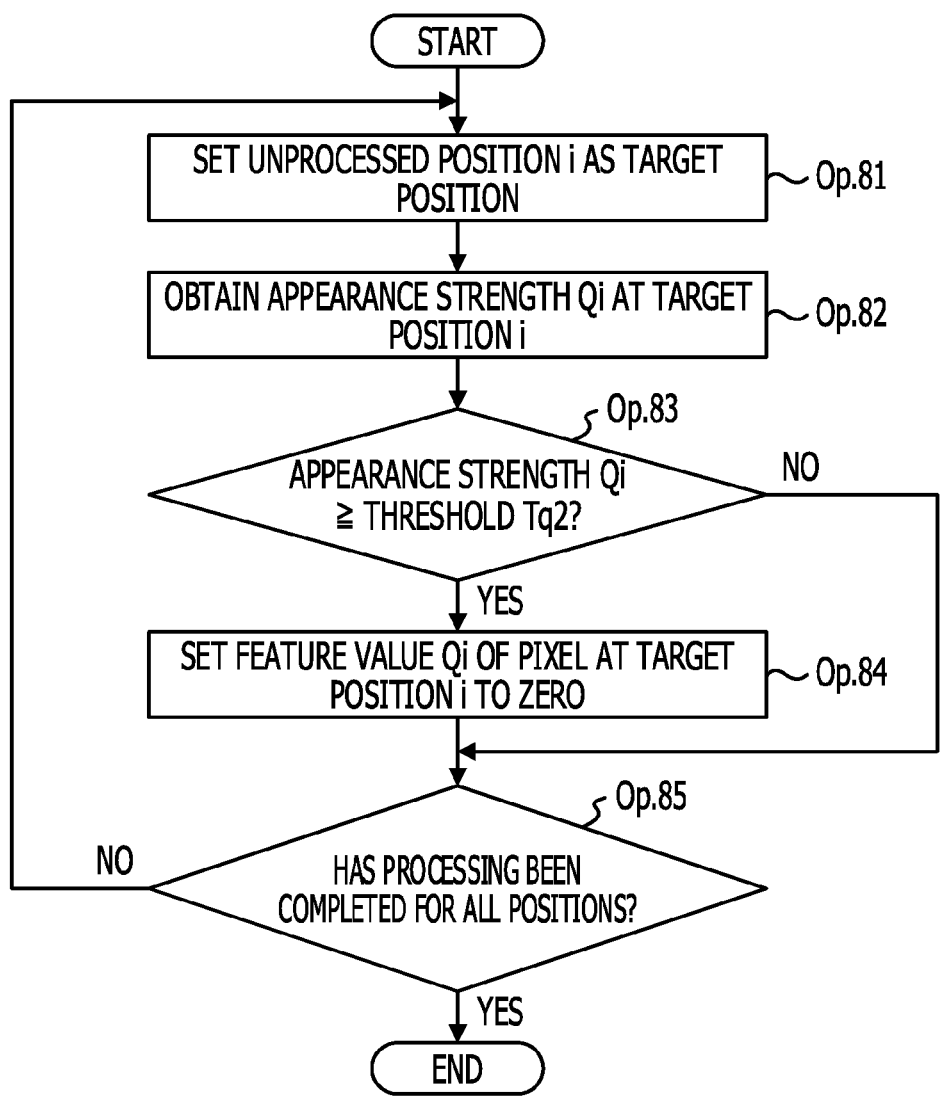
FIG. 9 is a flowchart illustrating a process for detecting reflections.

Next, when the process for accumulating features (Op. 6) or the process for checking features (Op. 7) has ended, the detection unit 15 executes the process for detecting reflections (Op. 8). The process for detecting reflections will be described in detail hereinafter. FIG. 9 is a flowchart illustrating the process for detecting reflections. The process for accumulating features and the process for checking features may be executed at each time or may be executed at certain time intervals.

First, the detection unit 15 sets an unprocessed position i as a target position (Op. 81). Next, the detection unit 15 obtains the appearance strength Qi at the target position i from the accumulated information stored in the storage unit 18 (Op. 82). The detection unit 15 then determines whether or not the appearance strength Qi is equal to or larger than the threshold Tq2 (Op. 83).

The threshold Tq2 is determined on the basis of Vp, Vn1, and Vn2. For example, when a reflection is to be removed with a smaller delay, the threshold Tq2 is set to a small value. In this embodiment, the threshold Tq2 is set to a value five times Vp.

If the appearance strength Qi is equal to or larger than the threshold Tq2 (YES in Op. 83), a feature located at the position i in the image at the time t is detected as a reflection. That is, the detection unit 15 sets the feature value Mi of a pixel at the target position i to zero (Op. 84). In other words, the feature caused by the reflection is removed from the image at the time t. In this embodiment, an edge is removed by setting the edge strength in an edge image to zero.

In this embodiment, when a reflection has been detected, the reflection is removed. However, the technique disclosed herein is not limited to this, and only a result of the detection may be output without removing the reflection depending on subsequent processing.

Next, the detection unit 15 determines whether or not the processing has been completed for all the positions i (Op. 85). The processing in Op. 85 is also executed if the appearance strength Qi is smaller than the threshold Tq2 (NO in Op. 83).

If the processing has not been completed for all the positions i (NO in Op. 85), the process returns to Op. 81, and the same processing is performed for a new position i. On the other hand, if the processing has been completed (YES in Op. 85), the process for detecting reflections ends. The detection unit 15 then outputs the image from which detected reflections have been removed to a processing unit that executes the subsequent processing.

When the process for detecting reflections (Op. 8) has ended in FIG. 6A, processing in Op. 9 illustrated in FIG. 6B and later is executed. First, the recognition unit 16 recognizes a recognition target in the image from which reflections have been removed (Op. 9). One of various known algorithms is applied in accordance with the recognition target. For example, the recognition unit 16 recognizes a lane line by applying an algorithm for recognizing a lane line. The recognition unit 16 then outputs a result of the recognition to a processing unit in a subsequent stage.

Next, the calculation unit 17 calculates the position Xt of the vehicle 1 at the time t on the basis of information regarding the position of the lane line and various parameters (Op. 10). A known method is applied as a method for calculating the position Xt of the vehicle 1 using the position of the lane line.

For example, the calculation unit 17 models the position of the lane line on the road. The calculation unit 17 then calculates the position X of the lane line on the road from the position of the lane line in the image. The following expression is applied:

$$x = \frac{1}{2}\frac{cf^2 H}{(y+f\cdot\varphi)} + \left(k\frac{W}{2} + X\right)\frac{(y+f\cdot\varphi)}{H} + f\cdot\theta$$

x denotes the x-coordinate of the lane line in the image. y denotes the y-coordinate of the lane line in the image. f denotes the focal distance of a lens of the image capture device 11. H denotes the installation height of the image capture device 11. W denotes the width of the lane line specified in the Road Traffic Law or the like. θ denotes the yaw angle of the image capture device 11. φ denotes the pitch angle of the camera. c denotes the curvature of the road. k is a constant depending on the direction of the lane line. k is −1 in the case of a left lane line and +1 in the case of a right lane line.

x and y are values obtained from the result of the recognition. f, H, W, and k are predetermined values. By repeatedly performing calculation adopting linear approximation using the above expression, the position X of the vehicle 1, the yaw angle θ, the pitch angle φ, and the curvature c of the road are calculated. Although the position X of the vehicle 1 is output in this embodiment because only the position X of the vehicle 1 is used in subsequent processing, the yaw angle θ, the pitch angle φ, and the curvature c may also be output, instead.

The calculation unit 17 outputs the calculated position Xt of the vehicle 1 to the warning device 19 and stores the position Xt in the storage unit 18 (Op. 11). For example, when the position Xt of the vehicle 1 indicates that the vehicle 1 is deviating from the traffic lane, the warning device 19 outputs a warning tone through a speaker.

The calculation unit 17 then determines whether or not to end the image processing (Op. 12). If the image processing is to end (YES in Op. 12), the processing ends. On the other hand, if the image processing is to continue (NO in Op. 12), the processing returns to Op. 1, and the processing is performed for a new image. For example, when an engine has stopped, the image processing ends.

As described above, in a technique for removing reflections from an image, the image processing device 12 may detect reflections from an image at a time when the vehicle 1 has moved in a direction different from the image capture direction. That is, features remaining at the same positions in images before and after the vehicle 1 moves in a direction different from the image capture direction are detected as reflections. Therefore, the image processing device 12 may accurately distinguish reflections and objects other than the reflections from each other.

Figure 10:
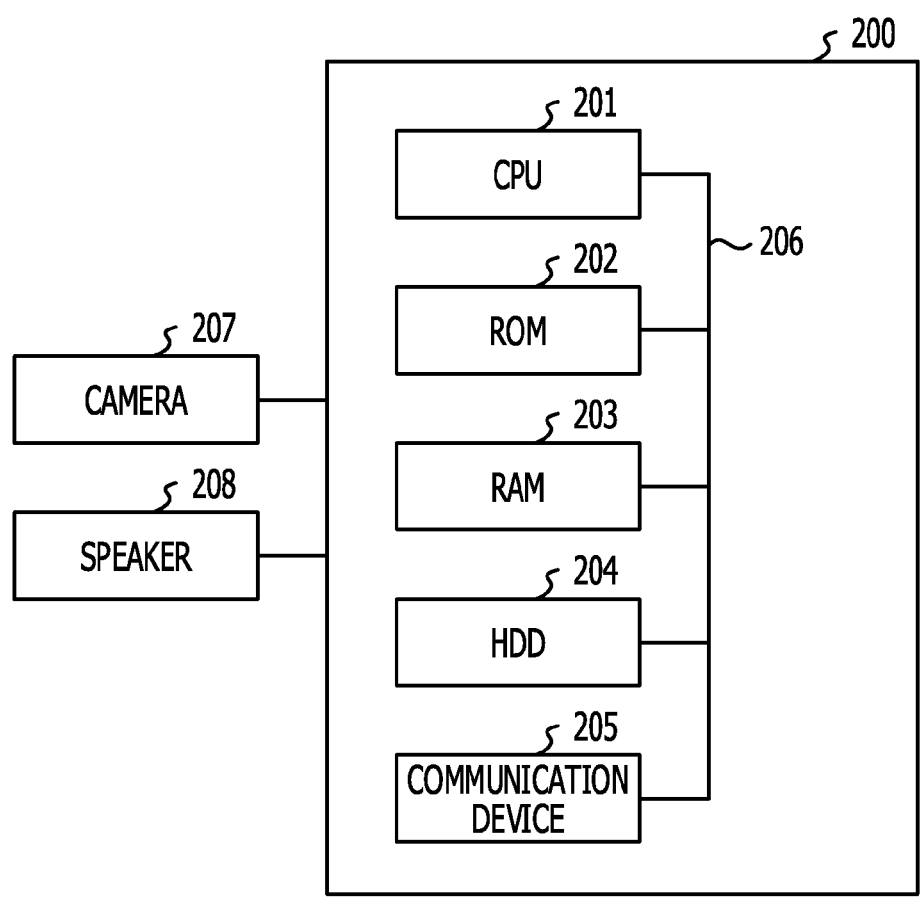
FIG. 10 is a diagram illustrating an example of the hardware configuration of the image processing device.

FIG. 10 is a diagram illustrating an example of the hardware configuration of a computer 200 that functions as the image processing device 12. The computer 200 may also function as the driving support apparatus 10 along with a camera 207.

The computer 200 is connected to the camera 207 and a speaker 208. The camera 207 is an example of the image capture device 11. The speaker 208 is a device that outputs a warning tone under control of the warning device 19 when the warning device 19 issues a warning.

The computer 200 includes a central processing unit (CPU) 201, a read-only memory (ROM) 202, a random-access memory (RAM) 203, a hard disk drive (HDD) 204, and a communication device 205. The computer 200 may further include a medium reading device.

These components are connected to one another through a bus 206. These components may transmit and receive data to and from one another under control of the CPU 201.

A program in which the method for processing an image illustrated in FIGS. 6A, 6B, and 7 is described is recorded on a recording medium that may be read by the computer 200. The recording medium that may be read by the computer 200 may be a magnetic recording device, an optical disk, a magneto-optical recording medium, a semiconductor memory, or the like. The magnetic recording device may be an HDD, a flexible disk (FD), a magnetic tape (MT), or the like.

The optical disk may be a digital versatile disc (DVD), a DVD-RAM, a compact disc read-only memory (CD-ROM), a CD-recordable (CD-R), a CD-rewritable (CD-RW), or the like. The magneto-optical recording medium may be a magneto-optical (MO) disk or the like. When the program is to be distributed, for example, portable recording media such as DVDs or CD-ROMs on which the program is recorded are sold.

For example, the medium reading device reads the program from a recording medium on which the image processing program is recorded. The CPU 201 stores the read program in the HDD 204. Alternatively, various programs may be stored in the ROM 202 or the RAM 203 that may be accessed by the CPU 201.

The CPU 201 is a central processing unit that controls the entire operation of the computer 200. By reading various programs from the HDD 204 and executing various programs, the CPU 201 functions as the obtaining unit 13, the determination unit 14, the detection unit 15, the recognition unit 16, and the calculation unit 17.

The HDD 204 also functions as the storage unit 18 under control of the CPU 201. As with the programs, information in the storage unit 18 may be stored in the ROM 202 or the RAM 203 that may be accessed by the CPU 201, instead. The RAM 203 also stores information temporarily generated during processes. The communication device 205 transmits and receives information to and from other devices connected through an interface. That is, the communication device 205 may realize part of the function of the obtaining unit 13.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An image processing device, comprising:
a memory; and
a processor coupled to the memory and configured to:
obtain a plurality of images captured by an image capture device that is directed forward and moves along with a moving body, and
detect a feature point of an image as being caused by light reflected from a surface of an object located inside the moving body, based on a positional relationship between the feature point among feature points in the image and feature points in at least one other image among the plurality of images, and
wherein the image is from among the plurality of images, and
the feature point is detected as being caused by light reflected, when the feature point exists in the image which is captured at a time when the moving body travels in a direction different from an image capture direction of the image capture device, and the positional relationship indicates the feature point in the image remains at the same position as in the at least one other image while positions of the feature points in the image changes from positions in the at least one other image.

2. The image processing device according to claim 1, wherein the processor is further configured to update appearance strengths of information regarding positions of the feature points in the plurality of images at the time when the moving body travels in the direction different from the image capture direction, and detect the feature point caused by light reflected at a position at which an appearance strength is equal to or larger than a threshold, and
wherein the appearance strengths depend on frequencies of appearances of the feature points.

3. The image processing device according to claim 1, wherein the moving body travels in a forward direction, and
wherein the moving body travels in the direction that is different from the image capture direction when the moving body travels in a lateral direction.

4. The image processing device according to claim 1, wherein the processor is further configured to remove the feature point caused by light reflected from the surface of the object from the image, and execute a process for recognizing a target in the image from which the light reflected has been removed.

5. The image processing device according to claim 4, wherein the target is a line configuring a traffic lane, and
wherein the moving body is a vehicle.

6. A method for processing an image, the method comprising:
obtaining a plurality of images captured by an image capture device that is directed forward and moves along with a moving body; and
detecting, by a processor, a feature point of an image as being caused by light reflected from a surface of an object located inside the moving body, based on a positional relationship between the feature point among feature points in the image and feature points in at least one other image among the plurality of images, and
wherein the image is from among the plurality of images, and
the feature point is detected as being caused by light reflected, when the feature point exists in the image which is captured at a time when the moving body travels in a direction different from an image capture direction of the image capture device, and the positional relationship indicates the feature point in the image remains at the same position as in the at least one other image while positions of the feature points in the image changes from positions in the at least one other image.

7. The method according to claim 6, further comprising:
updating appearance strengths of information regarding positions of the feature points in the plurality of images at the time when the moving body travels in the direction is different from the image capture direction; and
detecting the feature point caused by light reflected at a position at which an appearance strength is equal to or larger than a threshold, and
wherein the appearance strengths depend on frequencies of appearances of the feature points.

8. The method according to claim 6,
wherein the moving body travels in a forward direction, and
wherein the moving body travels in the direction that is different direction from the image capture direction when the moving body travels in a lateral direction.

9. The method according to claim 6, further comprising:
removing the feature point caused by light reflected from the surface of the object from the image; and
executing a process for recognizing a target in the image from which the light reflected has been removed.

10. The method according to claim 9,
wherein the target is a line configuring a traffic lane, and
wherein the moving body is a vehicle.

11. A device, comprising:
a memory; and
a processor coupled to the memory and configured to:
obtain a plurality of images captured by an image capture device that is directed forward and moves along with a moving body,
identify a feature point of an image as being caused by light reflected from a surface of an object located inside the moving body, based on a positional relationship between the feature point among feature points in the image and feature points in at least one other image among the plurality of images, and
issue a warning based on the feature point, the warning warns a deviation of the moving body from a lane, and
wherein the image is from among the plurality of images, and
the feature point is detected as being caused by light reflected, when the feature point exists in the image which is captured at a time when the moving body travels in a direction different from an image capture direction of the image capture device and the positional relationship indicates the feature point in the image remains at the same position as in the at least one other image while positions of the feature points in the image changes from positions in at least one other image among the plurality of images.

12. The device according to claim 11, wherein a value indicating appearance strength of the feature point is assigned to the feature point based on frequency of appearances of the feature point at a position during movement of the moving body in the direction different from the image capture direction.

13. The image processing device according to claim 1, wherein the feature point of the image is detected when the feature point appears in the image at a higher appearance frequency at the same position than an appearance frequency of feature points in the at least one other image among the plurality of images.

* * * * *